US011626672B2

(12) United States Patent
Nook et al.

(10) Patent No.: US 11,626,672 B2
(45) Date of Patent: *Apr. 11, 2023

(54) BATTERY CLAMP DEVICE

(71) Applicant: THE NOCO COMPANY, Glenwillow, OH (US)

(72) Inventors: Jonathan Lewis Nook, Gates Mills, OH (US); William Knight Nook, Sr., Shaker Heights, OH (US); James Richard Stanfield, Glendale, AZ (US); Derek Michael Underhill, Tempe, AZ (US)

(73) Assignee: The NOCO Company, Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,723

(22) Filed: Aug. 25, 2021

(65) Prior Publication Data

US 2021/0384653 A1 Dec. 9, 2021

Related U.S. Application Data

(63) Continuation of application No. 16/846,600, filed on Apr. 13, 2020, now Pat. No. 11,121,485.
(Continued)

(51) Int. Cl.
*H01R 11/24* (2006.01)
*H01R 11/28* (2006.01)
(Continued)

(52) U.S. Cl.
CPC ............. *H01R 11/24* (2013.01); *H01R 4/183* (2013.01); *H01R 4/30* (2013.01); *H01R 11/281* (2013.01); *H01R 11/282* (2013.01)

(58) Field of Classification Search
CPC ... H01R 11/282; H01R 11/281; H01R 11/287; H01R 11/24; H01R 4/30
See application file for complete search history.

(56) References Cited

U.S. PATENT DOCUMENTS

| 3,267,452 A | 8/1966 | Wolf |
| 4,453,791 A * | 6/1984 | Ledbetter ............... H01R 11/24 439/759 |

(Continued)

FOREIGN PATENT DOCUMENTS

| JP | S63-73867 U | 5/1988 |
| JP | 3200360 U | 9/2015 |
| JP | 3200360 U * | 10/2015 |

OTHER PUBLICATIONS

International Searching Authority, PCT International Search Report, dated Jun. 25, 2020, United States.
(Continued)

*Primary Examiner* — Briggitte R. Hammond
(74) *Attorney, Agent, or Firm* — Jones Day

(57) ABSTRACT

A battery clamp having a first inner metal battery clamp member having a handle portion and a clamp portion, a second inner metal battery clamp member having a handle portion and a clamp portion, a first outer insulating battery clamp member having a handle portion and a clamp portion connected to the first inner metal battery clamp, and a second outer insulating battery clamp member having a handle portion and a clamp portion connected to the second inner metal battery clamp. The first inner metal battery clamp member and/or the second inner metal battery clamp member having a battery cable connector configured to allow a user to access the battery cable connector with the user's fingers or a tool while avoiding interference with the handle portions of the battery clamp.

23 Claims, 17 Drawing Sheets

Related U.S. Application Data

(60) Provisional application No. 62/835,924, filed on Apr. 18, 2019, provisional application No. 62/834,699, filed on Apr. 16, 2019.

(51) Int. Cl.
  H01R 4/30 (2006.01)
  H01R 4/18 (2006.01)

(56) References Cited

U.S. PATENT DOCUMENTS

| | | | |
|---|---|---|---|
| 5,556,309 A | 9/1996 | Sharpe et al. | |
| 6,910,915 B2 | 6/2005 | Kutteruf | |
| 7,104,815 B2* | 9/2006 | Ng | H01R 13/447 |
| | | | 439/822 |
| 7,238,884 B2* | 7/2007 | Tanaka | H01R 13/5216 |
| | | | 174/74 R |
| 7,736,200 B2* | 6/2010 | Sproesser | H01R 11/24 |
| | | | 439/754 |
| 9,692,155 B2* | 6/2017 | Toscani | H01R 11/24 |
| 2004/0172795 A1 | 9/2004 | Cheng et al. | |
| 2009/0233495 A1 | 9/2009 | Sproesser | |
| 2009/0247020 A1 | 10/2009 | Gathman et al. | |

OTHER PUBLICATIONS

International Searching Authority, PCT Written Opinion of the International Searching Authority, dated Jun. 25, 2020, United States.

IP Australia, Examination report No. 1 for standard patent application, dated Aug. 5, 2022, Australia.

The Office of the Controller General of Patents, Designs and Trade Marks, India Examination Report, dated Apr. 21, 2022, India.

Canadian IP, Appl. 3,137,071, Examiner Requisition, dated Jan. 9, 2023.

Japan Patent Office, Appl. 2021-561837, Notice of Reason of Refusal, dated Nov. 22, 2022.

UK Patent Office, Appl. GB2115262.4, Examination Report, dated Oct. 18, 2022.

\* cited by examiner

BATTERY CLAMP DEVICE

FIELD

The present invention is directed to a battery clamp device for use, for example, with battery jump starting cables or battery jump starters.

BACKGROUND

Currently, there exists a number of battery clamps used on jump starting cables or battery jump starters.

There exists a need for an improved battery clamp.

SUMMARY

The present invention is direct to an improved battery clamp device. The battery clamp device comprises or consists of an outer battery clamp connected to an inner battery clamp. The outer battery clamp, for example, can be made of an electrically insulating material and the inner battery clamp can be made of an electrically conductive material (e.g. metal). The inner battery clamp nests within the outer battery clamp, and are connected together (e.g. by snap fit connector and/or mechanical connection).

The battery clamp device is configured to facilitate connection with a battery cable. Specifically, the battery clamp device is configured to prevent mechanical interference with a user's fingers or a tool for connecting or disconnecting fastener connecting the battery cable to the battery clamp device. For example, the inner battery clamp is provided with a cable connector configured to prevent mechanical interference with handle portions of the battery clamp device by placing the cable connector at one end of at least one handle portion along with the cable connector having a cable end receiver oriented parallel to a center longitudinal axis of the at least one handle portion.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector is configured to receive a battery cable end into the battery cable end receiver.

The presently described subject matter is directed to a battery clamp device, comprising or consisting of: a first inner metal battery clamp member having a handle portion and a clamp portion; a second inner metal battery clamp member having a handle portion and a clamp portion; a first outer plastic battery clamp member connected to the first inner metal battery clamp; a second outer plastic battery clamp member connected to the second inner metal battery clamp; a pivot pin pivotally connecting the first inner metal battery clamp member to the second inner metal battery clamp member; and a battery cable connector connected to an end of at least one of the first inner metal battery clamp member and the second inner metal battery clamp member, the battery cable connector having a split cylindrical-shaped metal plate end defining a battery cable end receiver configured to be crimped closed, wherein the battery cable connector is configured to receive a battery cable end into the battery cable end receiver, and then be crimped inwardly to close the split cylindrical-shaped metal plate end to secure and anchor the battery cable end within the battery cable end receiver of the battery cable connector.

The presently described subject matter is directed to a battery clamp device, comprising: a first inner metal battery clamp member having a handle portion and a clamp portion; a second inner metal battery clamp member having a handle portion and a clamp portion; a first outer plastic battery clamp member connected to the first inner metal battery clamp; a second outer plastic battery clamp member connected to the second inner metal battery clamp; a pivot pin pivotally connecting the first inner metal battery clamp member to the second inner metal battery clamp member; and a battery cable connector connected to an end of at least one of the first inner metal battery clamp member and the second inner metal battery clamp member, the battery cable connector having a split cylindrical-shaped metal plate end transitioning into a continuous cylindrical-shaped metal plate together defining a battery cable end receiver configured to be crimped closed, wherein the battery cable connector is configured to receive a battery cable end into the battery cable end receiver, and then be crimped inwardly to close the split cylindrical-shaped metal plate end to secure and anchor the battery cable end within the battery cable end receiver of the battery cable connector.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector is configured to receive a battery cable end into the battery cable end receiver, wherein the cylindrical-shaped metal plate end is a split cylindrical-shaped metal plate end.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector is configured to receive a battery cable end into the battery cable end receiver, wherein the cylindrical-shaped metal plate end is a split cylindrical-shaped metal plate end, and wherein the edges of the split cylindrical-shaped metal plate end are spaced apart.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector is configured to receive a battery cable end into the battery cable end receiver, wherein the edges of the split cylindrical-shaped metal plate end abut each other when the split cylindrical-shaped metal plate is crimped inwardly.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector is configured to receive a battery cable end into the battery cable end receiver, wherein the cylindrical-shaped metal plate end is a split cylindrical-shaped metal plate end, and wherein the edges of the split cylindrical-shaped metal plate having interlocking fingers.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the cylindrical-shaped metal plate end is a continuous cylindrical-shaped metal plate end configured to be crimped inwardly to secure and anchor the battery cable end within the battery cable end receiver.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the cylindrical-shaped metal plate end is a continuous cylindrical-shaped metal plate end having one or more threaded holes for each accommodating a set screw for securing the battery cable end within the battery cable end receiver.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector comprises a split cylindrical-shaped metal plate end transitioning into a continuous cylindrical-shaped metal plate together defining a battery cable end receiver.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector comprises a split cylindrical-shaped metal plate end transitioning into a continuous cylindrical-shaped metal plate together defining a battery cable end receiver, and wherein a diameter of the split cylindrical-shaped metal plate end transitions downwardly into the continuous cylindrical-shaped metal plate a diameter less than the diameter of the split cylindrical-shaped metal plate end.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the battery cable connector comprises a split cylindrical-shaped metal plate end transitioning into a continuous cylindrical-shaped metal plate together defining a battery cable end receiver, and wherein the continuous cylindrical-shaped metal plate transitions into a funnel-shaped portion having an increasing diameter.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein at least one of the first inner metal battery clamp member and the second inner metal battery clamp member have a U-shaped transverse cross section extending along a length of the at least one of the first inner metal battery clamp member and the second inner metal battery clamp member providing a pair of spaced apart inner edges, the U-shaped transverse cross section transitioning into the battery cable connector.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member, wherein the pair of pivot plate portions of the first inner metal battery clamp member are provided with arc-shaped flanges protruding outwardly from the sides of the first inner metal battery clamp member to accommodate the pivot plate portions of the second inner metal battery clamp, wherein the pivot plate portions of the second inner metal battery clamp are arc-shaped and nest within the arc-shaped flanges protruding outwardly from the sides of the first inner metal battery clamp.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member having the handle portion and the clamp portion nests within at least a portion of the first outer insulating battery clamp member having the handle portion and the clamp portion connected to the first inner metal battery clamp, and wherein a second inner metal battery clamp member having a handle portion and a clamp portion nests within at least a portion of the second outer insulating battery clamp member having the handle portion and the clamp portion connected to the second inner metal battery clamp.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, and wherein the second outer insulating battery clamp member snap fits onto the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, wherein the second outer insulating battery clamp member snap fits onto the second inner metal battery clamp member, wherein the first outer insulation battery clamp member comprises a snap fit protrusion snap fitting into a slot provided in the first inner metal battery clamp member, and wherein the second outer insulation battery clamp member comprises a snap fit protrusion snap fitting into a slot provided in the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, wherein the second outer insulating battery clamp member snap fits onto the second inner metal battery clamp member, wherein the first outer insulation battery clamp member comprises a snap fit protrusion snap fitting into a slot provided in the first inner metal battery clamp member, wherein the second outer insulation battery clamp member comprises a snap fit protrusion snap fitting into a slot provided in the second inner metal battery clamp member, wherein the first outer insulation battery clamp member comprises a plurality of spaced apart snap fit protrusions snap fitting into a plurality of spaced apart slots, respectively, in the first inner metal battery clamp member, and wherein the second outer insulation battery clamp member comprises a plurality of spaced apart snap fit protrusions snap fitting into a plurality of spaced apart slots provided in the second inner metal battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member having the handle portion and the clamp portion nests within at least a portion of the first outer insulating battery clamp member having the handle portion and the clamp portion connected to the first inner metal battery clamp, wherein a second inner metal battery clamp member having a handle portion and a clamp portion nests within at least a portion of the second outer insulating battery clamp member having the handle portion and the clamp portion connected to the second inner metal battery clamp, wherein the first outer insulating battery clamp member snap fits onto the first inner metal battery clamp member, wherein the second outer insulating battery clamp member snap fits onto the second inner metal battery clamp member, wherein the first outer insulation battery clamp member comprises a snap fit protrusion snap fitting into a slot provided in the first inner metal battery clamp member, wherein the second outer insulation battery clamp member comprises a snap fit protrusion snap fitting into a slot provided in the second inner metal battery clamp member, and wherein each snap fit protrusion is split into two protrusion portions each having an edge barb portion to grip inner edges of respective slots after being snap fitted to prevent disconnection of each snap fit protrusion from each respective slot.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member, wherein the pair of pivot plate portions of the first inner metal battery clamp member are provided with arc-shaped flanges protruding outwardly from the sides of the first inner metal battery clamp member to accommodate the pivot plate portions of the second inner metal battery clamp, wherein the pivot plate portions of the second inner metal battery clamp are arc-shaped and nest within the arc-shaped flanges protruding outwardly from the sides of the first inner metal battery clamp, wherein the arc-shaped flanges protruding outwardly from the sides of the first inner metal battery clamp member nest within arc-shaped inner edge portions of the first outer insulating battery clamp member, and wherein the arc-shaped pivot plate portions of the first inner metal battery clamp nest with arc-shaped inner edge portions of the second outer insulating battery clamp member.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the handle portion of the first outer insulating battery clamp member is provided with a protrusion, and wherein the handle portion of the second outer insulating battery clamp member is provided with a protrusion.

The presently described subject matter is directed to a battery clamp device, comprising or consisting of: a first inner metal battery clamp member having a handle portion and a clamp portion; a second inner metal battery clamp member having a handle portion and a clamp portion; a first outer insulating battery clamp member having a handle portion and a clamp portion connected to the first inner metal battery clamp; a second outer insulating battery clamp member having a handle portion and a clamp portion connected to the second inner metal battery clamp; a pivot pin pivotally connecting the first inner metal battery clamp member to the second inner metal battery clamp member; and a battery cable connector connected to an end of least one of the first inner metal battery clamp member and the second inner metal battery clamp member, the battery cable connector being a cylindrical-shaped metal plate end defining a battery cable end receiver, the battery cable connector being configured to secure and anchor the battery cable end within the battery cable end receiver, wherein the handle portion of the first outer insulating battery clamp member is provided with a protrusion, wherein the handle portion of the second outer insulating battery clamp member is provided with a protrusion, wherein the protrusions form an X-shaped protrusion when the handle portions are squeezed together.

DETAILED DESCRIPTION

A battery clamp device 10 according to the present invention is shown in FIGS. 1-18. The battery clamp device 10 comprises an outer battery clamp 10A connected to an inner battery clamp 10B, as shown in FIG. 1.

The outer battery clamp portion 10A can be made, for example, of an electrically insulating material (e.g. resin, synthetic resin, plastic, rubber, fiberglass, composite, or other suitable electrical insulating material). The inner battery clamp portion 10B can be made, for example, of an electrically conductive material (e.g. metal, steel, metal alloy, steel alloy, plated steel, chrome plated steel, nickel plated steel, aluminum, anodized aluminum copper, or other suitable electrically conductive material).

Figure 1:
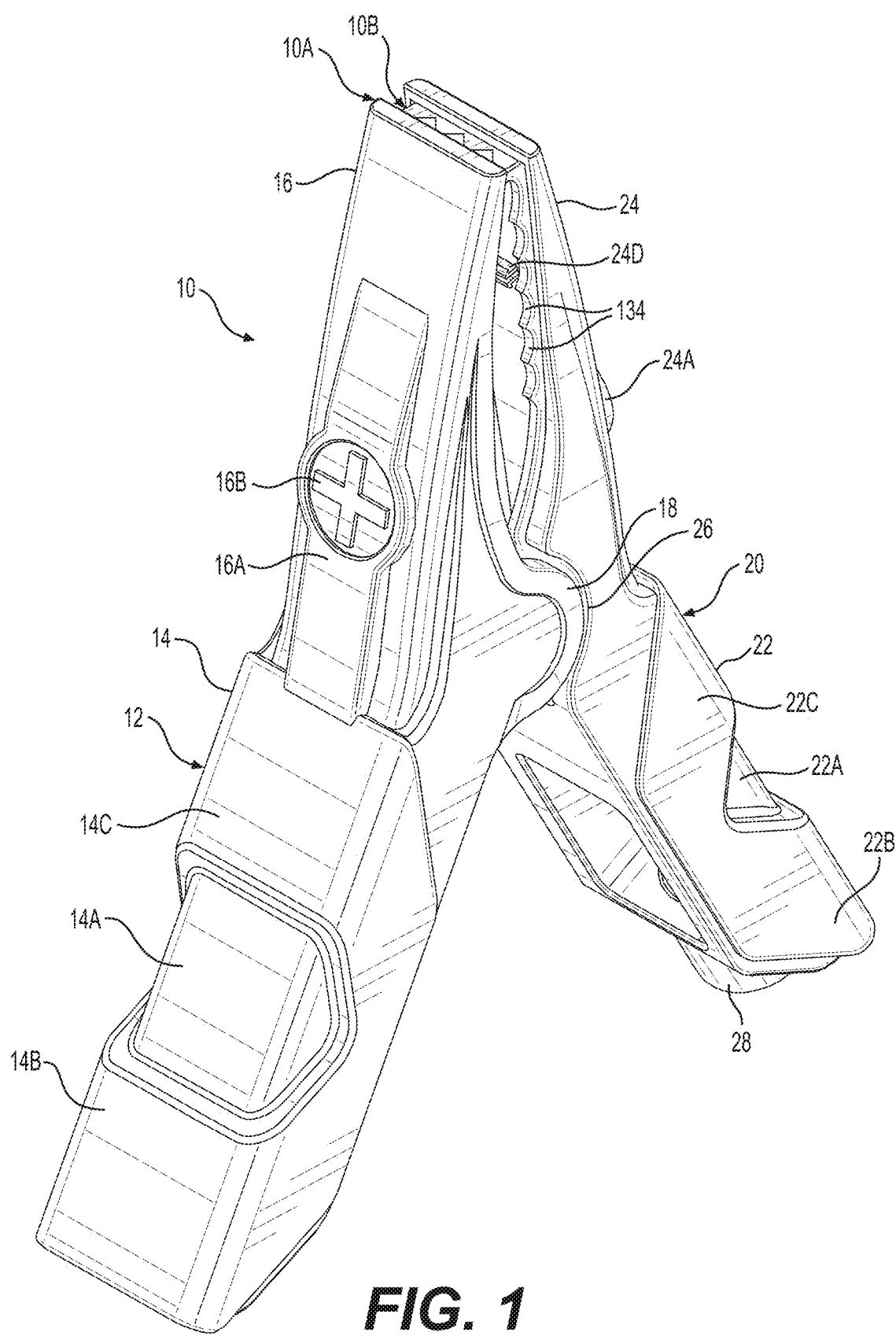
FIG. 1 is a perspective view of a positive polarity battery clamp according to the present invention.
Figure 2:
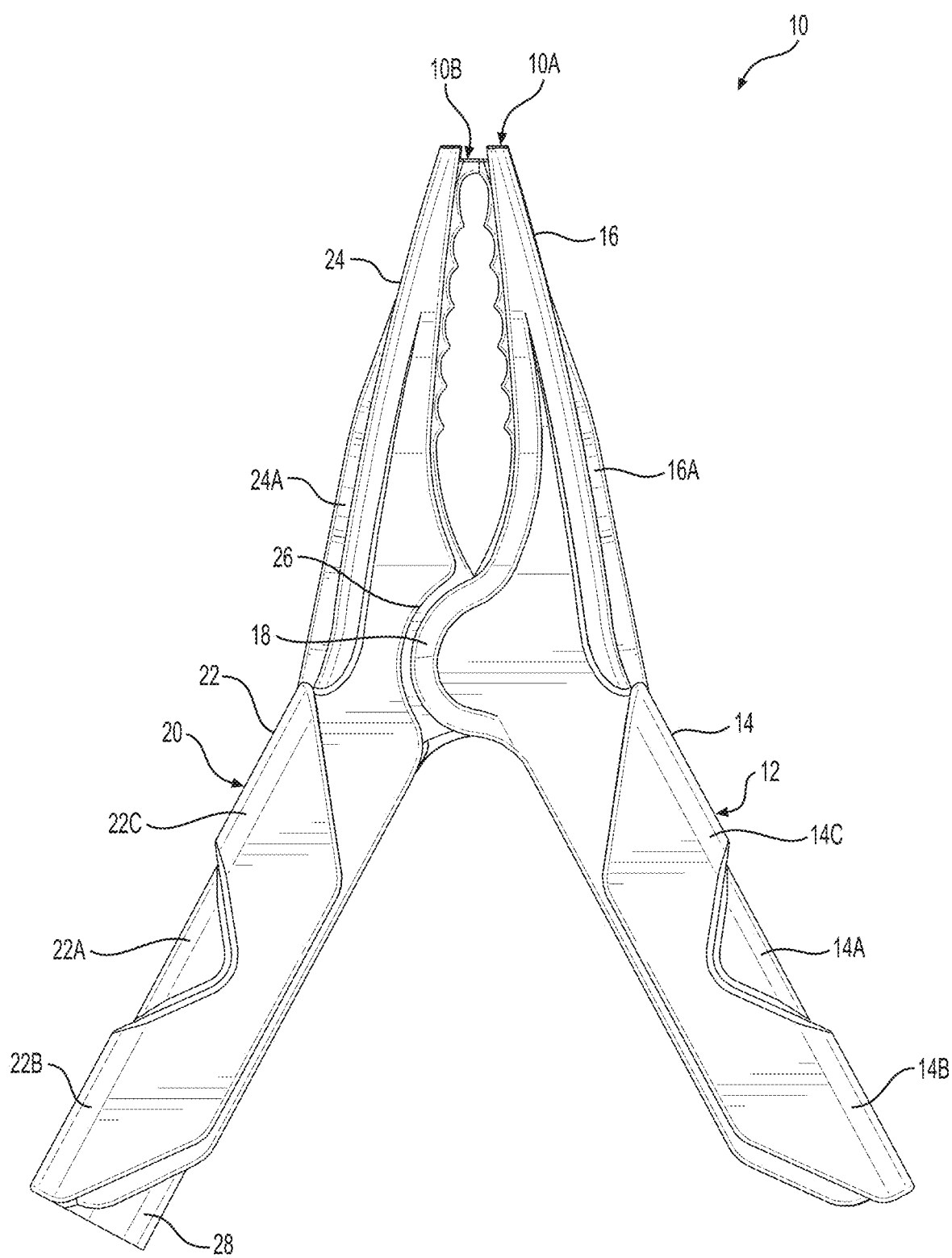
FIG. 2 is a left side view of the battery clamp shown in FIG. 1.
Figure 3:
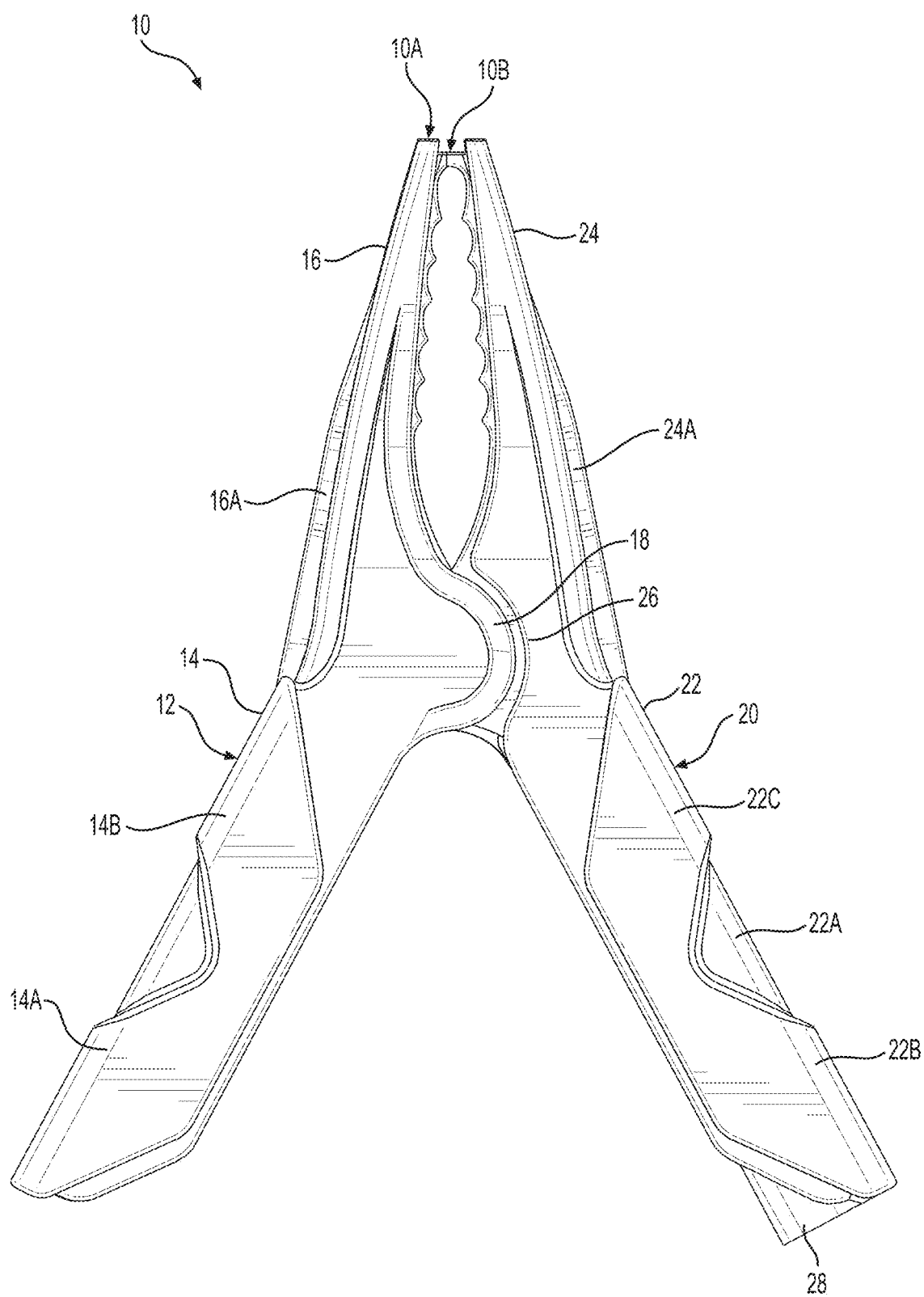
FIG. 3 is a right side view of the battery clamp shown in FIG. 1.
Figure 4:
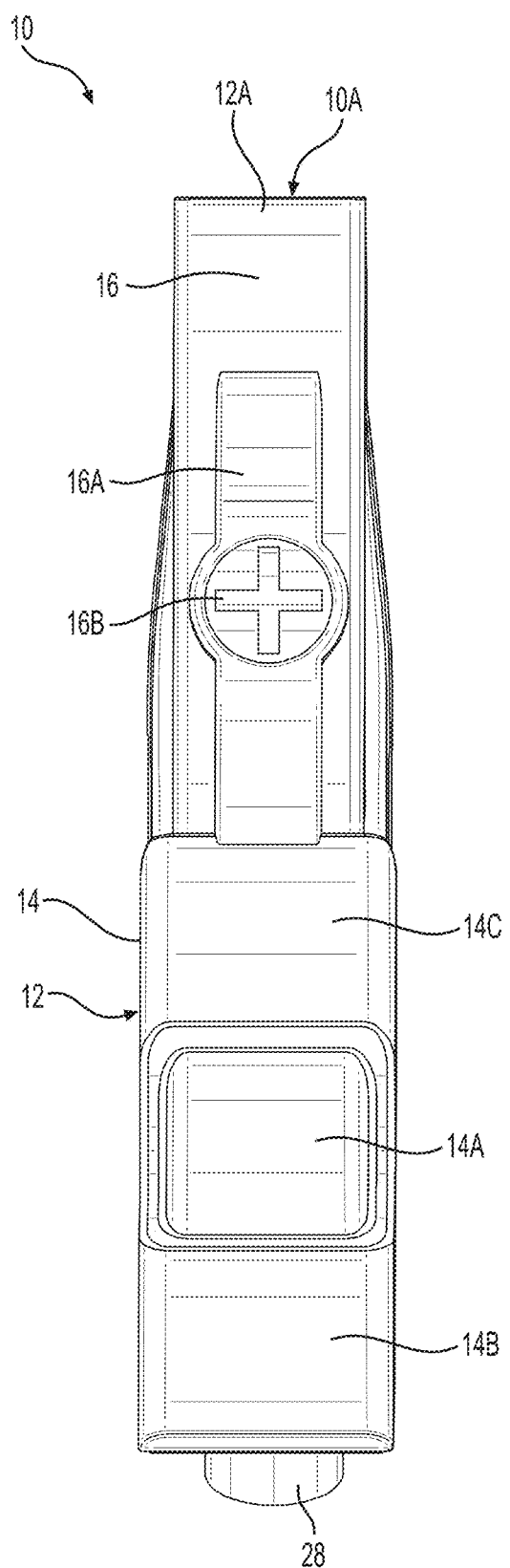
FIG. 4 is a front view of the battery clamp shown in FIG. 1.
Figure 5:
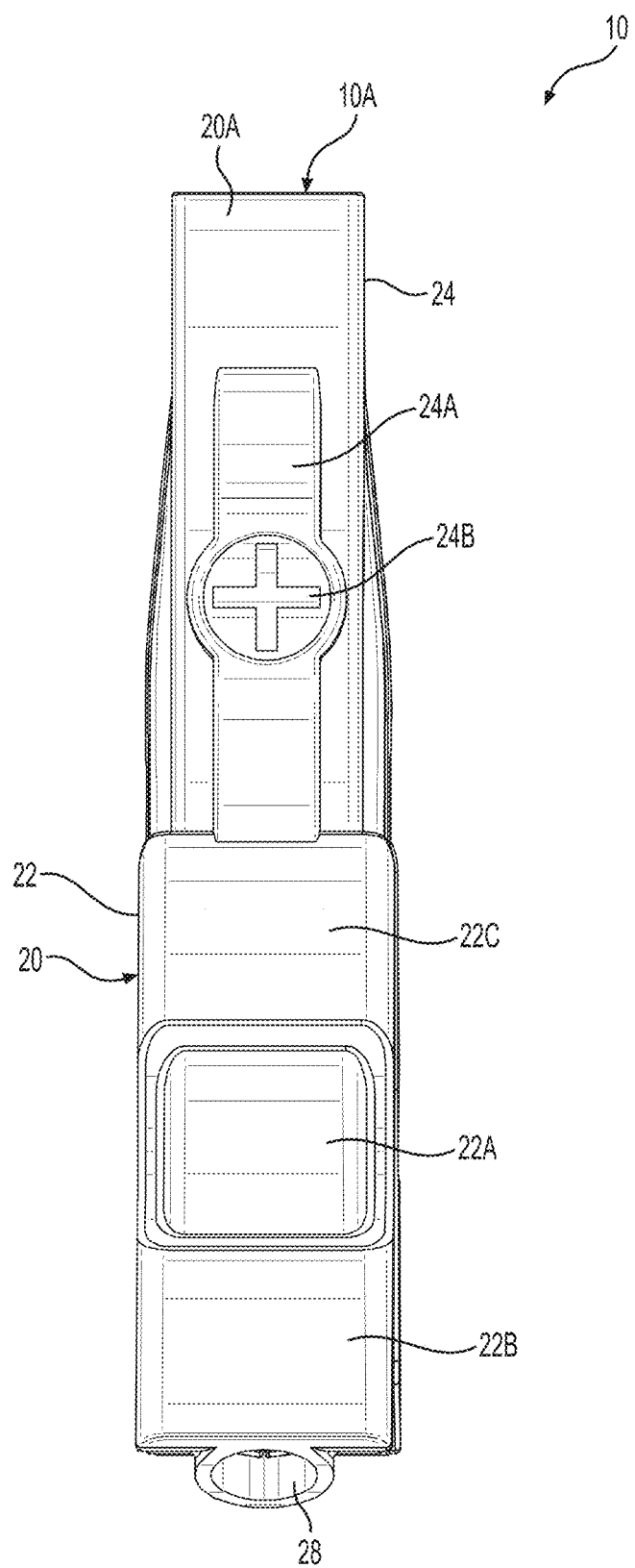
FIG. 5 is a rear view of the battery clamp shown in FIG. 1.
Figure 6:
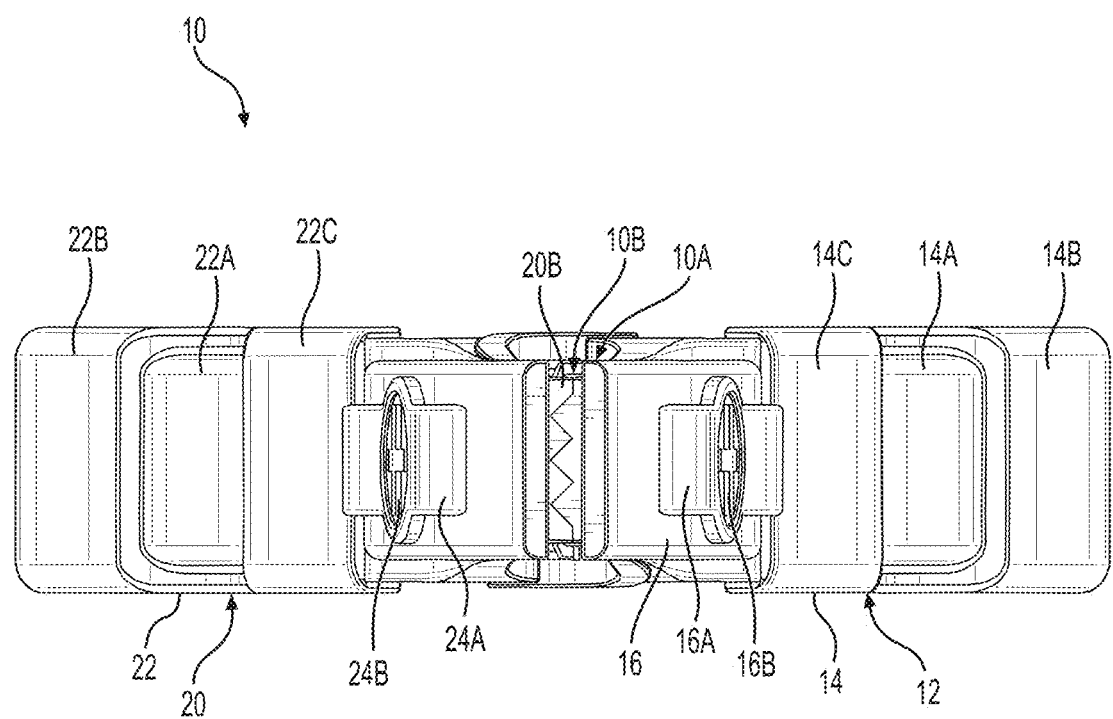
FIG. 6 is a top view of the battery clamp shown in FIG. 1.
Figure 7:
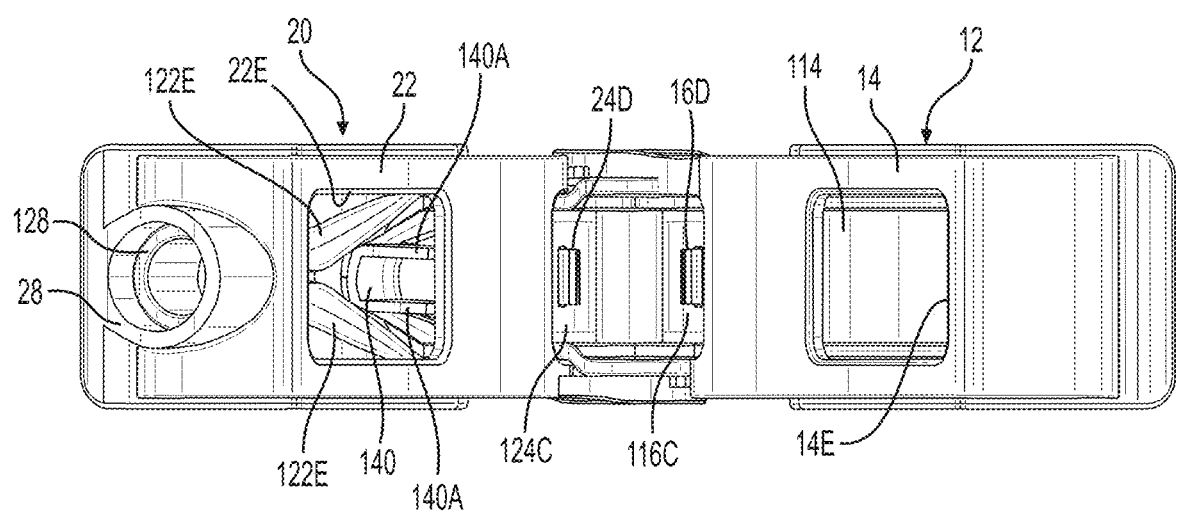
FIG. 7 is a bottom view of the battery clamp shown in FIG. 1.
Figure 8:
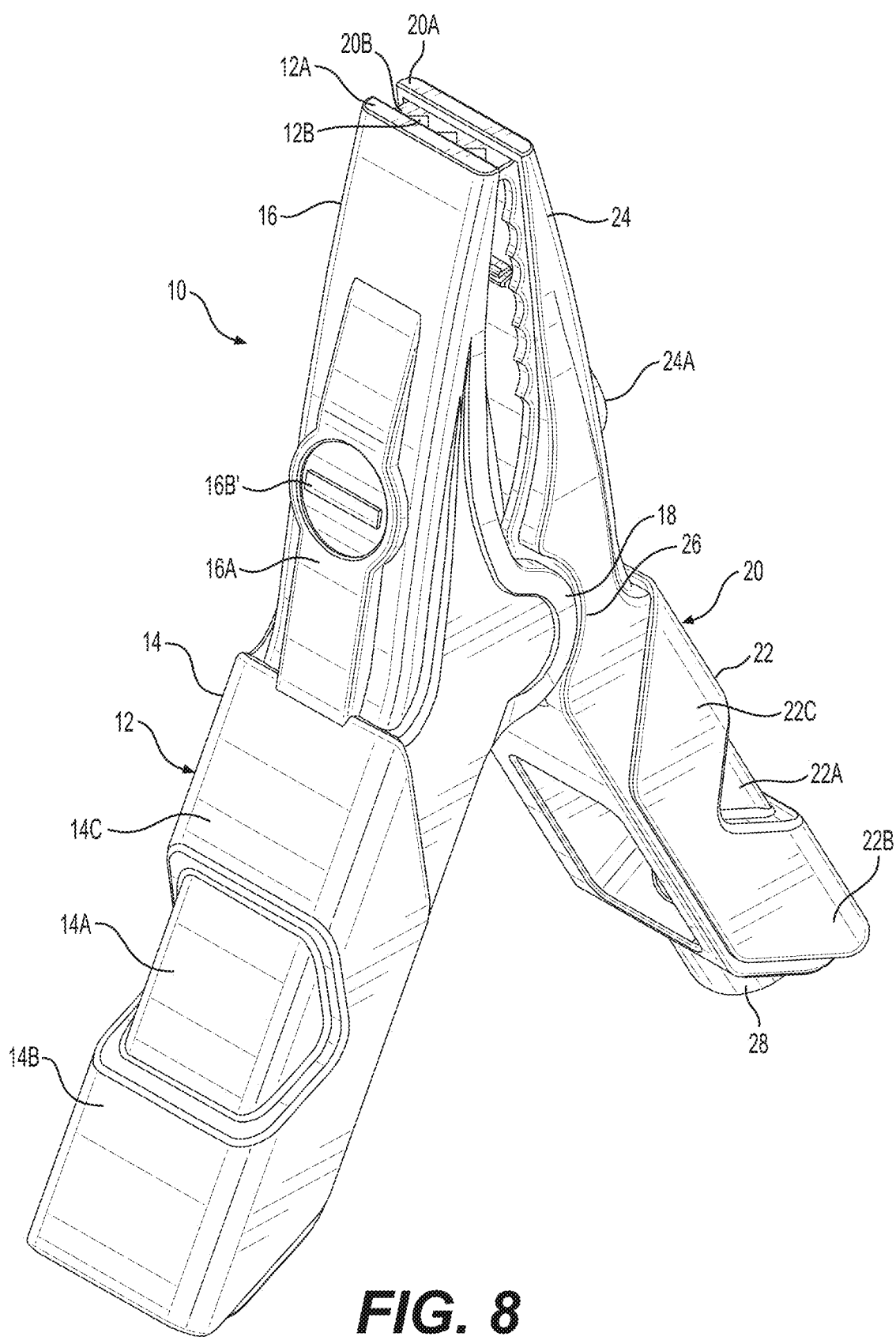
FIG. 8 is a perspective view of a negative polarity battery clamp according to the present invention, the same as the positive polarity battery clamp shown in FIG. 1 except for a negative polarity symbol instead of a positive polarity symbol.

The outer battery clamp portion 10A comprises a first outer battery clamp member 12 (e.g. made of plastic injection molded material) having an outer handle portion 14 and outer clamp portion 16 and a second outer battery clamp member 20 (e.g. made of plastic injection molded material) having an outer handle portion 22 and an outer clamp portion 24, as shown in FIG. 1.

The outer handle portion 14 is provided with an outer handle surface 14A and protrusions 14B, 14C. The outer handle portion 22 is provided with an outer handle surface 22A and protrusions 22B, 22C. It is noted that the protrusions 14B, 14C, 22B, 22C form an X-shaped protrusion together when the outer handle portions 14, 22, for example, are squeezed together by a user.

The outer clamp portion 16 is provided with a protrusion 16A and a raised positive (+) polarity symbol 16B. The outer clamp portion 24 is provided with a protrusion 24A (FIG. 3) and a raised positive (+) polarity symbol 24B.

The first battery clamp member 12 is provided with arc-shaped inner edges 18 located on both sides of the first battery clamp member 12. The second battery clamp member 22 is provided with arc-shaped inner edges 26 located on both sides of the second battery clamp member 22. See FIGS. 4 and 5.

Figure 9:
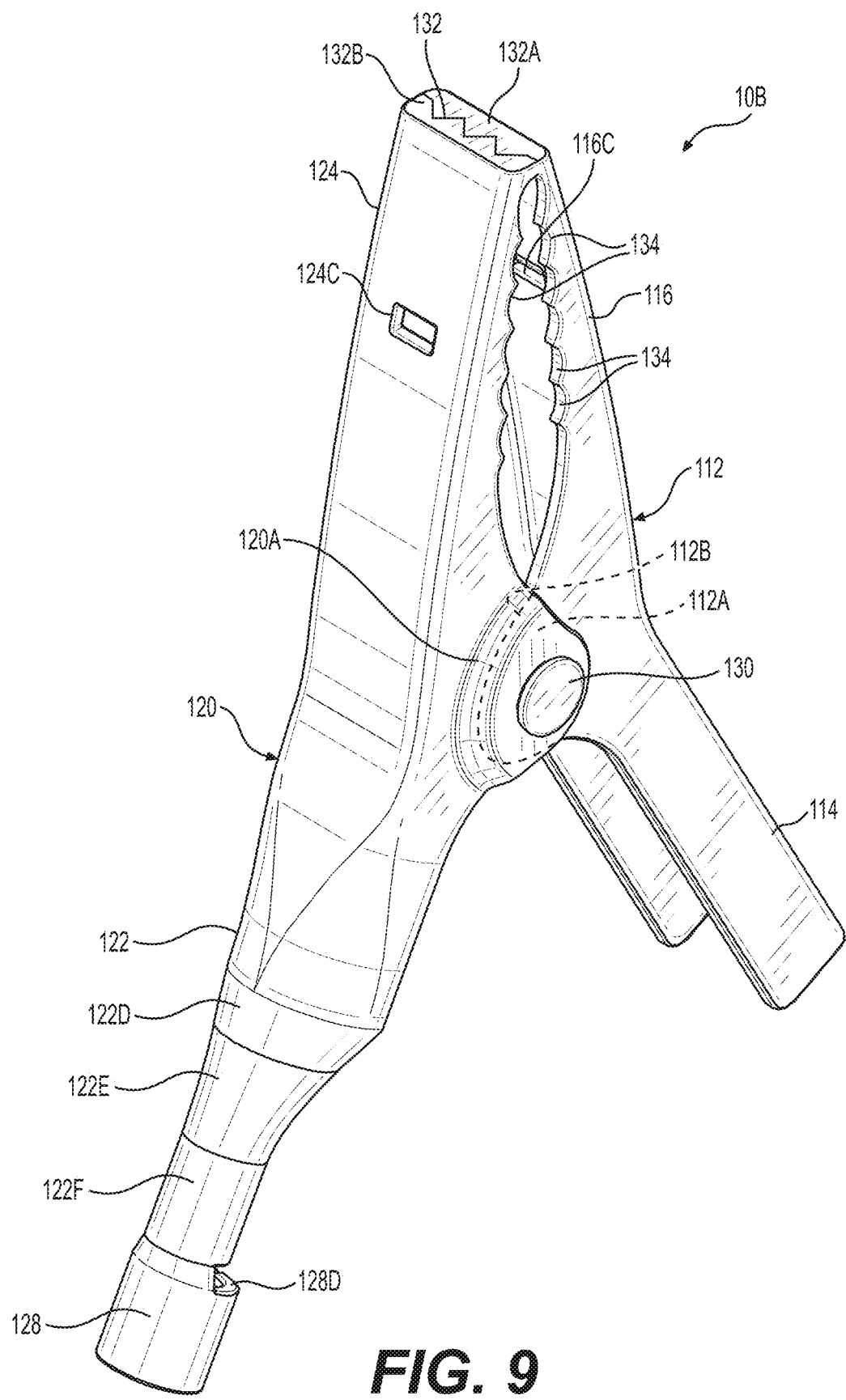
FIG. 9 is a perspective view of an inner battery clamp part of the battery clamps shown in FIGS. 1 and 8.
Figure 10:
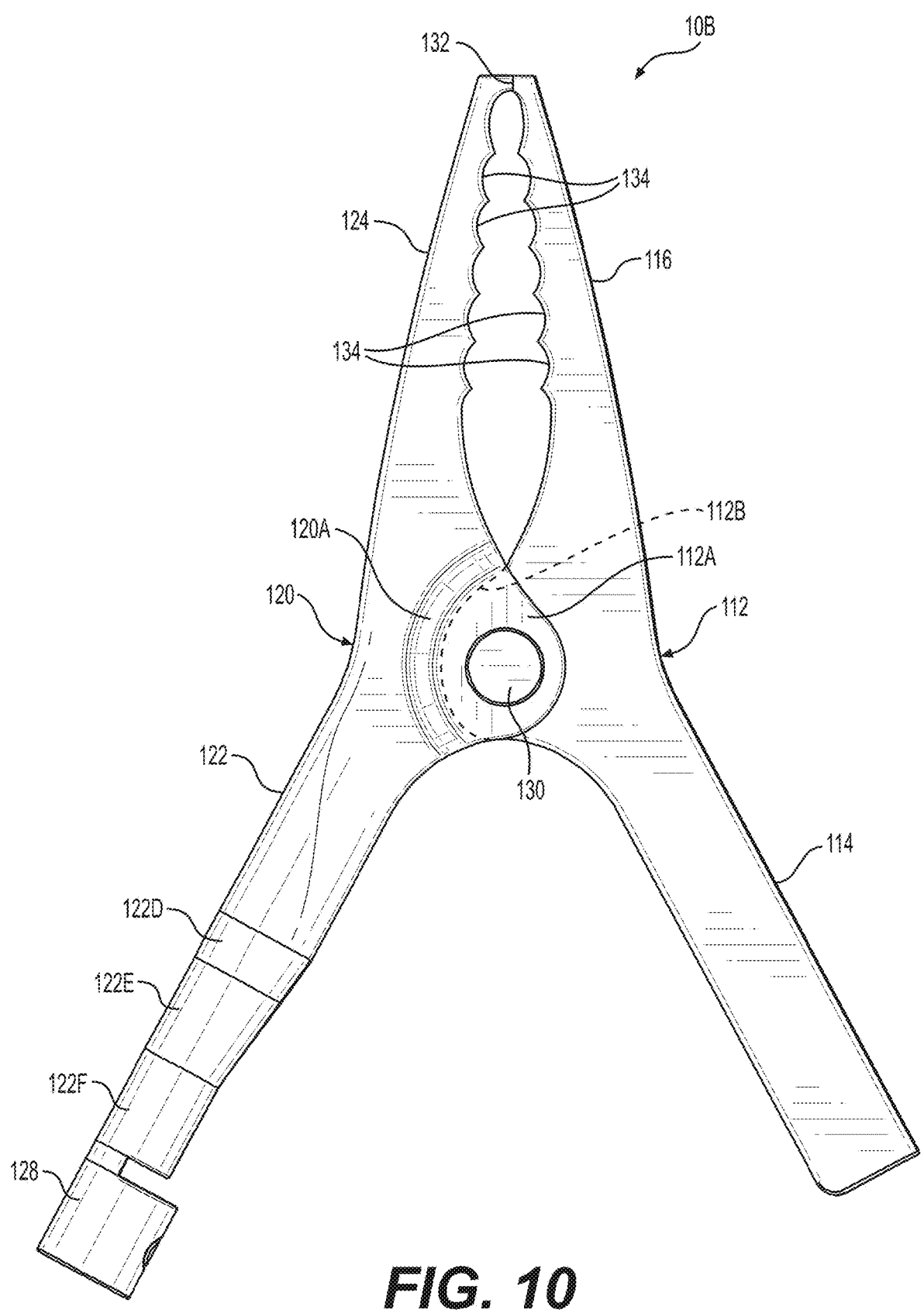
FIG. 10 is a right side view of the battery clamp part shown in FIG. 9.
Figure 11:
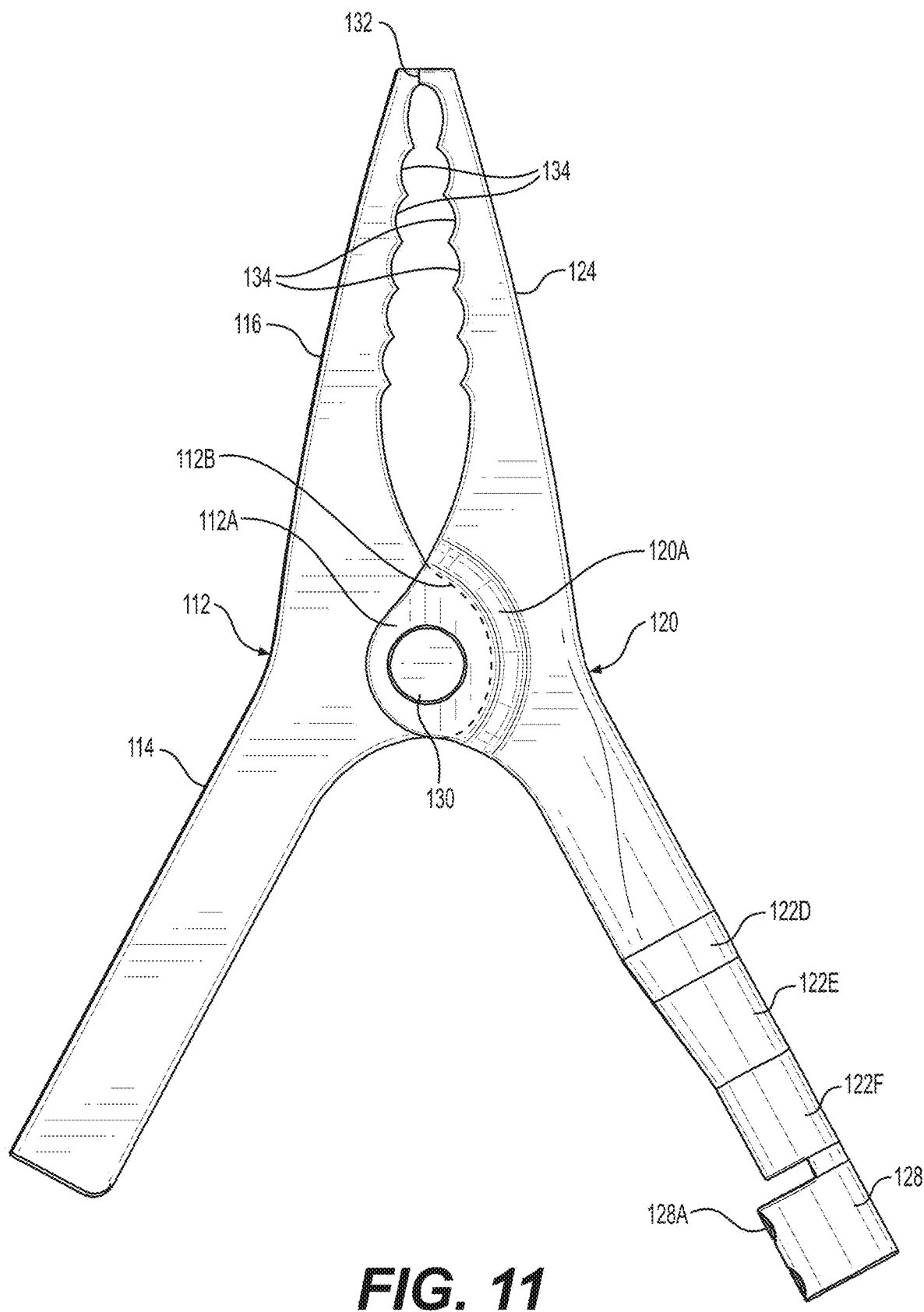
FIG. 11 is a left side view of the battery clamp part shown in FIG. 9.
Figure 12:
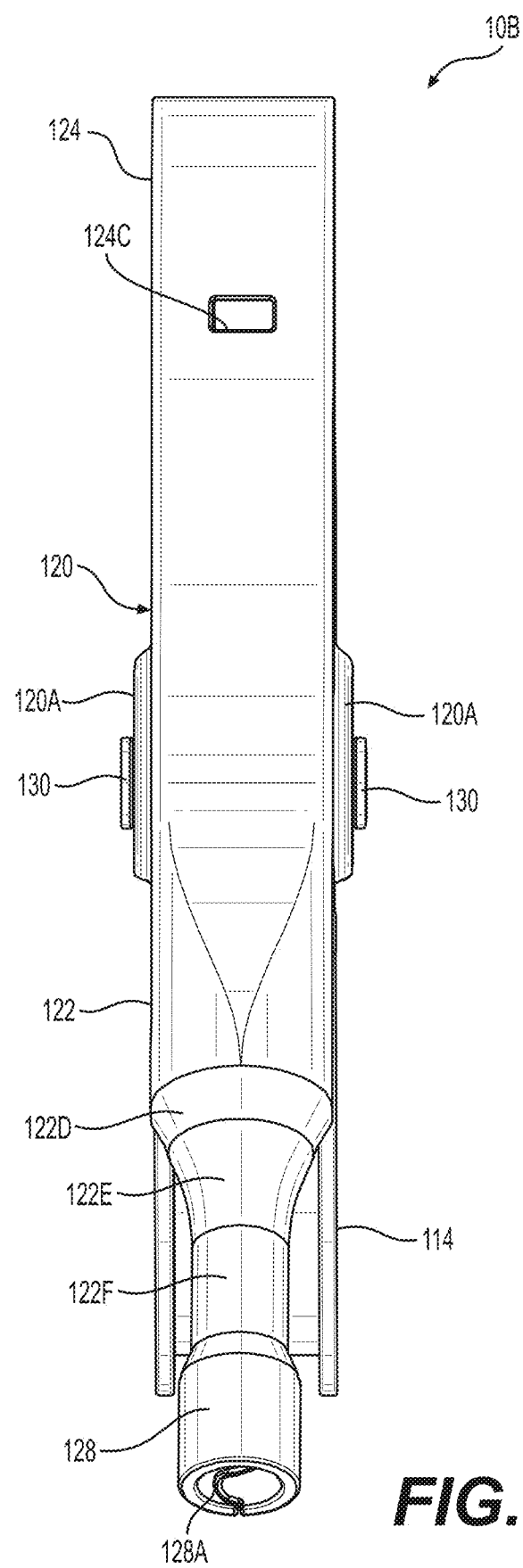
FIG. 12 is a front view of the battery clamp part shown in FIG. 9.
Figure 13:
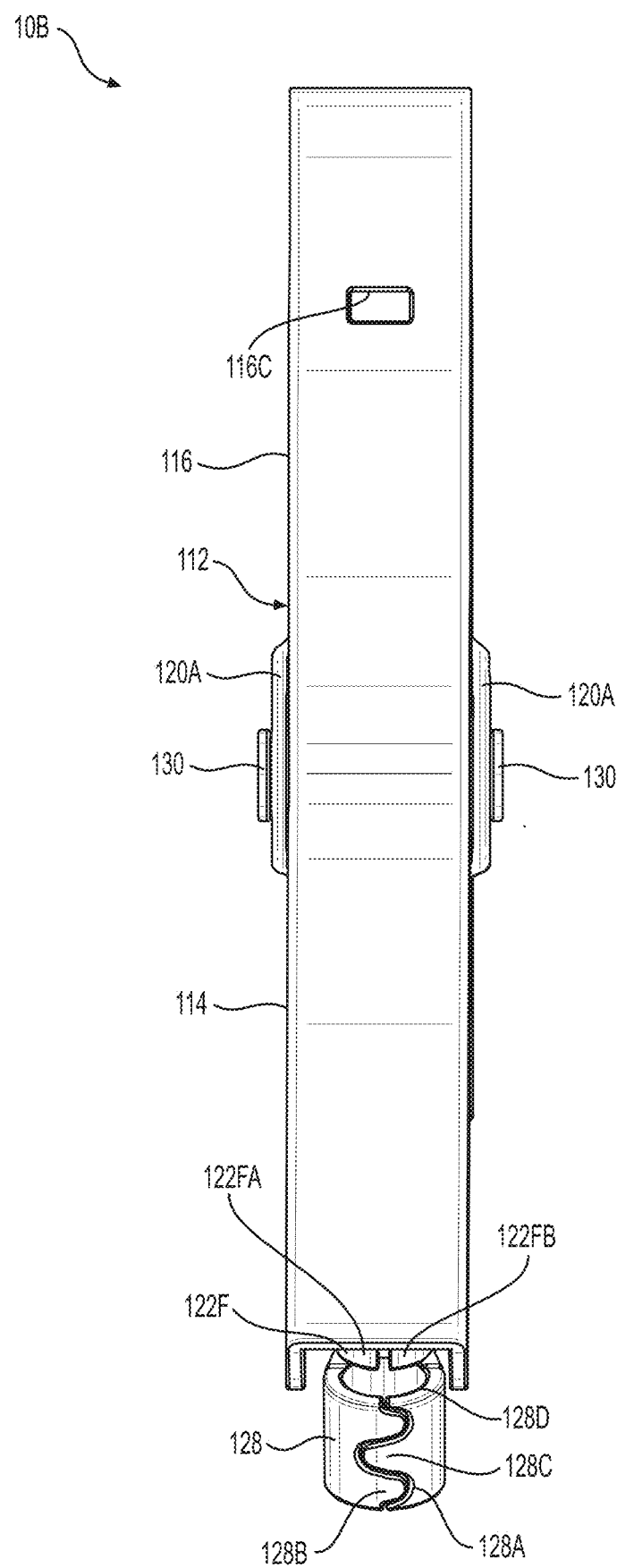
FIG. 13 is a rear view of the battery clamp part shown in FIG. 9.
Figure 14:
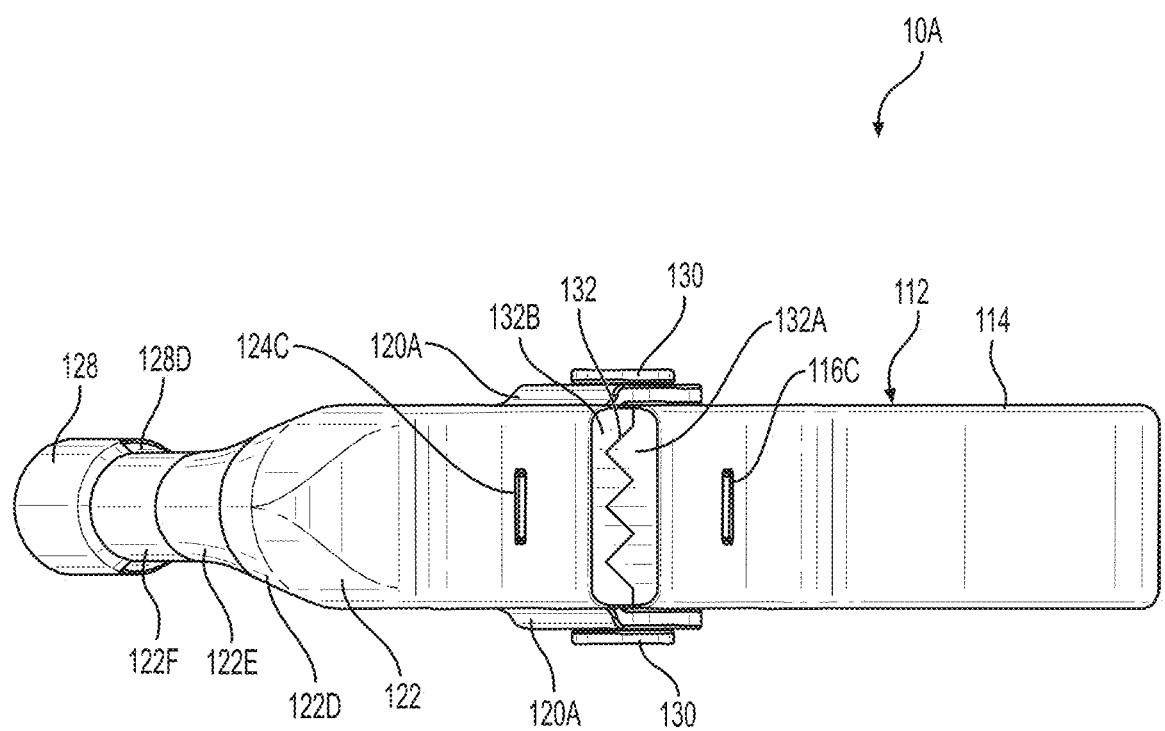
FIG. 14 is a top view of the battery clamp part shown in FIG. 9.
Figure 15:
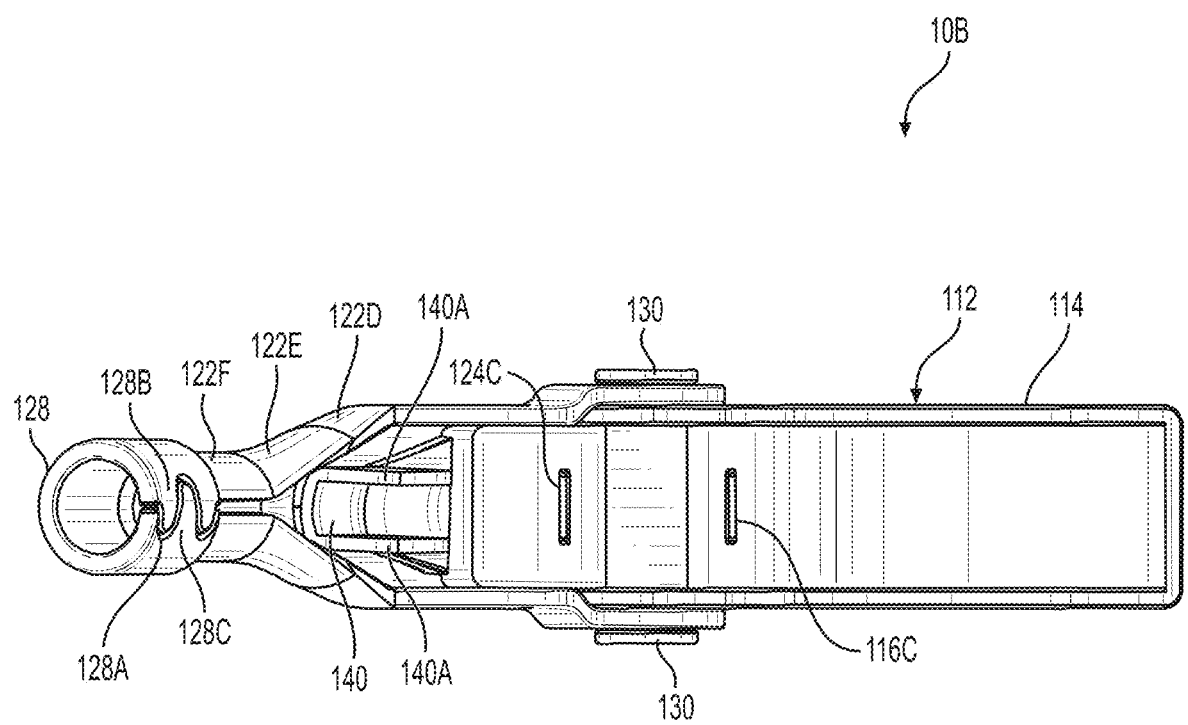
FIG. 15 is a bottom view of the battery clamp part shown in FIG. 9.

The inner battery clamp device 10B comprises a first inner battery clamp portion 112 made of conductive metal (e.g. made from stamped or forged metal plate) having an inner handle portion 114 and an inner clamp portion 116. The first inner battery clamp member 112 is pivotally connected together (e.g. via pivot pin 130, see FIG. 9) to a second inner battery clamp portion 120 having an inner handle portion 122 and an inner clamp portion 124, as shown in FIG. 9.

The first inner battery clamp member 112 is provided with a slot 116C (FIG. 9) for providing a mechanical connection (e.g. snap fit connection) with a protrusion (e.g. snap fit protrusion 16D the same as snap fit protrusion 24D shown in FIG. 1) of the first outer battery clamp member 12. The second inner battery clamp member 120 is provided with a slot 124C (FIG. 9) for providing a mechanical connection (e.g. snap fit connection) with a protrusion (e.g. snap fit protrusion 24D shown in FIG. 1) of the second outer battery clamp member 20.

The snap fit connections described above are located at the outer clamp portions 16, 24. Additional connections (e.g. mechanical connections, additional snap fit connections) can be provided on the outer handle portions 14, 22. For example, the outer handle portions 14, 22 can be provided with transverse cross members 14F, 14G, 22F, 22G (FIG. 7) configured for connecting to (e.g. capturing) the inner handle portions 114, 122. Specifically, the transverse cross members 14F, 22F wrap across and capture inner sides (e.g. inner edges) of the inner handle portions 114, 122. The transverse cross members 14G, 22G, wrap across and capture the edges and ends of the inner handle portions 114, 122. During assembly, each inner handle portion 114, 122 is slipped underneath of the transverse cross members 14F, 14G, 22F, 22G until the inner handle portions 114, 122 bottom out within the cross member 22F, 22G, and then the outer clamp portions 16, 24 are snap fitted to the inner clamp portions 116, 124.

Again, the inner battery clamp 10B is made of an electrically conductive material such as metal. For example, the first inner battery clamp portion 112 and the second inner battery clamp portion 120 are made from stamped sheet metal (e.g. steel, aluminum, copper, brass, metal alloy, or other suitable electrically conductive material), and then metal plated (e.g. with chrome, nickel, metal alloy) to make corrosion resistant. The first inner battery clamp portion 112 and the second inner battery clamp portion 120 are then assembled together with spring 131 (FIGS. 17 and 18) and pivot pin 130 (FIG. 9).

Figure 16:
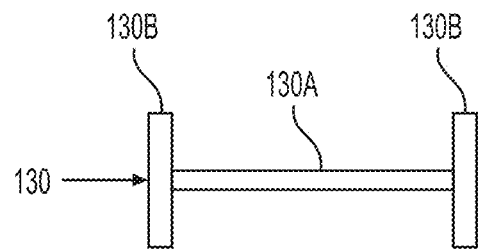
FIG. 16 is a side view of the pin.

The inner battery clamp 10B is configured for connection with a battery cable 154 (FIG. 16). For example, the inner handle portion 122 (FIG. 12) is fitted with a battery end connector 128, as shown in FIGS. 12, 15, 17, and 18. The battery cable connector 128, for example, comprises a first split cylindrical-shaped metal plate end section oriented parallel to a longitudinal axis of the inner handle portion 122. The first split cylindrical-shaped metal plate end section is in an open position (FIG. 17) readied for receiving the battery cable end 142A. Specifically, the battery cable 142 is provided with an exposed battery cable end 142 with the insulation 142B removed. The exposed battery cable end 142 is inserted into a receiver 128A of the battery cable connector 128, and then the battery cable connector 128 is pressed inwardly by force F (FIG. 17) or crimped closed to secure and anchor the exposed battery cable end 142 within the receiver 128A of the battery cable connector 128. Alternatively, the first split cylindrical-shaped metal plate end section can be a first continuous cylindrical-shaped metal plate end section. For example, the first continuous cylindrical-shaped metal plate end section along its side can be provided with one or more threaded through holes each accommodating a set screw for securing and anchoring the battery cable end 142A within the receiver 128A of the battery cable connector 128. Further, the battery cable end 142A (FIGS. 17 and 18) can be soldered and/or welded into the battery cable connector 128.

Figure 17:
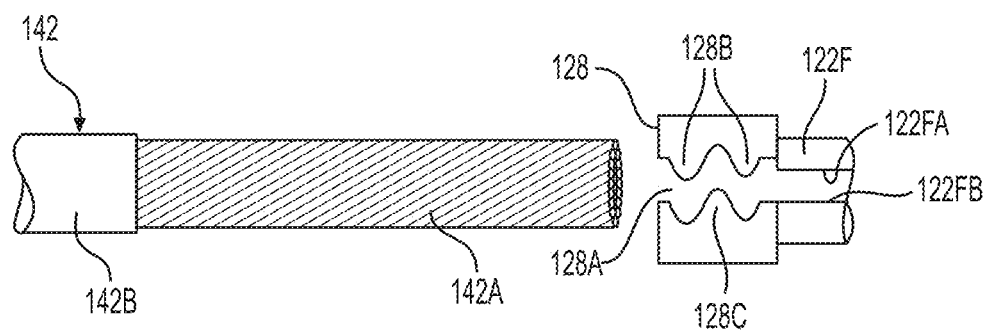
FIG. 17 is a side view showing the connection between the battery cable end and the battery cable end connector.

The edges of the battery cable connector 128 can be provided with interlacing fingers 128B, 128C, as shown in FIG. 17. The interlacing fingers 128B can be pressed inwardly into the exposed battery cable end 142A to further grip strands of the exposed battery cable end 142A. In addition, the exposed battery cable end 142A can be soldered and/or welded to further secure and anchor the battery cable end 142A within the receiver 128A of the battery cable connector 128.

The battery cable connector 128 comprises the first split cylindrical-shaped metal plate end section having initially spaced apart edges with interlacing fingers 128B, 128C and a second split cylindrical-shaped section 122F having initially spaced apart edges 122FA, 122FB, as shown in FIG. 17. After the battery cable end 142A of the battery cable 142 is fully inserted into the battery cable connector 128, the battery cable connector 128 is pressed together and/or crimped together causing the spaced apart edges with interlacing fingers 128B, 128C to be forced together to abut each other along with the spaced apart edges 122FA, 122FB being also forced together to abut each other.

The battery cable connector 128 further comprises a third funnel-shaped metal plate section having outwardly tapering walls 122E and a fourth section having a pair of spaced apart metal plates 140A, 140A. The metal plates 140A, 140A (FIGS. 15 and 18) of the fourth section can be pressed together to providing an additional gripping force onto the battery cable end 142B. In addition, the wall sections 140A, 140A can be soldered and/or welded to the battery cable end 142A to enhance conductivity, and further secure and anchor the battery cable end 142A to the battery cable end connector 128.

Figure 18:
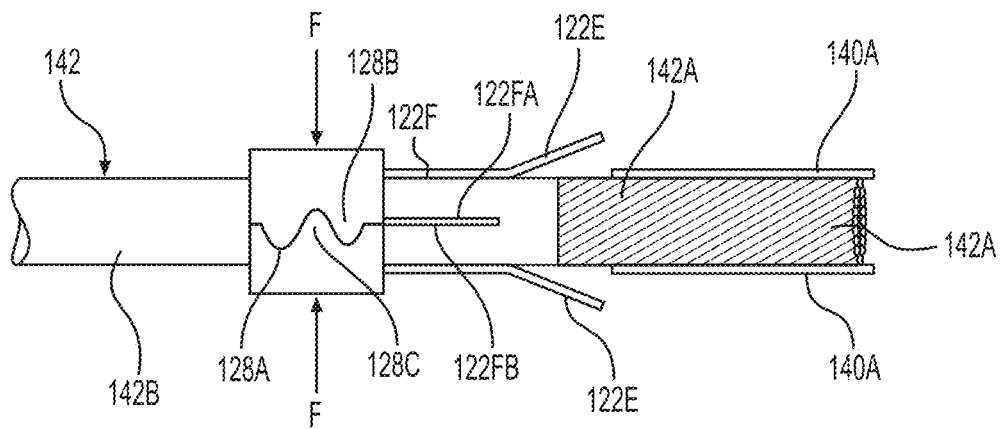
FIG. 18 is a side view showing the connection between the battery cable end and the battery cable end connector.

As shown in FIG. 18, the wall thickness of the first split cylindrical-shaped metal plate end section 128 is greater than the wall thickness of the second split cylindrical-shaped metal plate section 122F. Further, the inner diameter of the first split cylindrical-shaped end section 128 is the same as the inner diameter of the second split cylindrical-shaped metal plate section 122F. The greater wall thickness of the first split cylindrical-shaped metal plate section 128 enhances the amount of gripping force on the battery cable end after being pressed inwardly or crimped closed.

Figure 19:
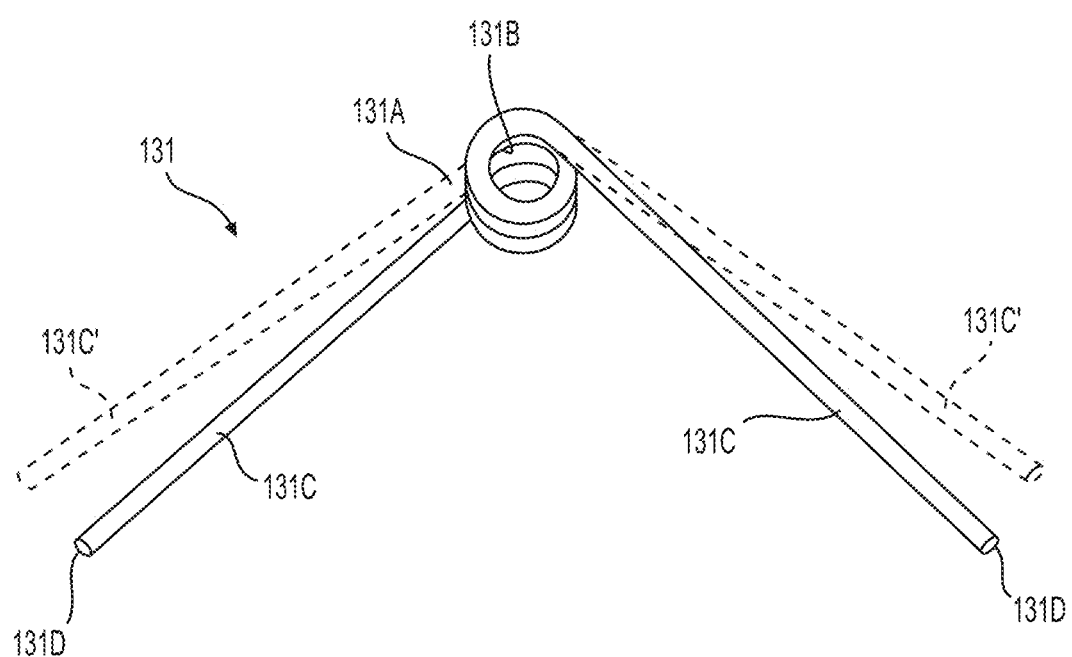
FIG. 19 is a perspective view of a spring part of the battery clamp shown in FIG. 1 and the inner battery clamp part shown in FIG. 9.

A spring 131 (FIG. 19) is installed within the inner battery clamp 10B to spring bias the outer clamp portions 12, 16 together. Specifically, the spring 131 is provided with a through hole 131B to accommodate the pivot pin 130 while the arm 131C having ends 131D contact an inner surface of the arm portions 114, 122 (FIG. 9) of the inner battery clamp 10B.

The invention claimed is:

1. A battery clamp device, comprising:
a first inner metal battery clamp member having a handle portion and a clamp portion;
a second inner metal battery clamp member having a handle portion and a clamp portion;
a first outer insulating battery clamp member having a handle portion and a clamp portion connected to the first inner metal battery clamp;
a second outer insulating battery clamp member having a handle portion and a clamp portion connected to the second inner metal battery clamp;
a pivot pin pivotally connecting the first inner metal battery clamp member to the second inner metal battery clamp member; and
a battery cable connector provided at an end of at least one of the first inner metal battery clamp member and the second inner metal battery clamp member, the battery cable connector comprising a first cylindrical-shaped metal plate end section defining a battery cable end receiver including a receiving end exposed to an exterior of the battery clamp device, the battery cable connector being configured to receive secure and anchor a battery cable end within the battery cable connector, the first split cylindrical-shaped metal plate end section transitions into a second split cylindrical-shaped metal plate section.

2. A battery clamp device, comprising:
a first inner metal battery clamp member having a handle portion and a clamp portion;
a second inner metal battery clamp member having a handle portion and a clamp portion;
a first outer plastic battery clamp member connected to the first inner metal battery clamp;
a second outer plastic battery clamp member connected to the second inner metal battery clamp;
a pivot pin pivotally connecting the first inner metal battery clamp member to the second inner metal battery clamp member; and
a battery cable connector provided at an end of at least one of the first inner metal battery clamp member and the second inner metal battery clamp member, the battery cable connector having a first split cylindrical-shaped metal plate end section defining a battery cable end receiver including a receiving end exposed to an exterior of the battery clamp device, the battery cable end receiver configured to be pressed inwardly or crimped closed, the first split cylindrical-shaped metal plate end section transitions into a second split cylindrical-shaped metal plate section, wherein the battery cable connector is configured to receive a battery cable end into the battery cable end receiver, and then be pressed inwardly or crimped closed to secure and anchor the battery cable end within the battery cable connector.

3. A battery clamp device, comprising:
a first inner metal battery clamp member having a handle portion and a clamp portion;
a second inner metal battery clamp member having a handle portion and a clamp portion;
a first outer plastic battery clamp member connected to the first inner metal battery clamp;
a second outer plastic battery clamp member connected to the second inner metal battery clamp;
a pivot pin pivotally connecting the first inner metal battery clamp member to the second inner metal battery clamp member; and
a battery cable connector provided at an end of at least one of the first inner metal battery clamp member and the second inner metal battery clamp member, the battery cable connector having a first split cylindrical-shaped metal plate end section transitioning into another split cylindrical-shaped metal plate together defining a battery cable end receiver including a receiving end exposed to an exterior of the battery clamp device, the battery cable end receiver configured to be pressed inwardly or crimped closed,
wherein the battery cable connector is configured to receive a battery cable end into the battery cable end receiver, and then be pressed inwardly or crimped close to secure and anchor the battery cable end within the battery cable connector.

4. The device according to claim 1, wherein inner edges of the first split cylindrical-shaped metal plate end section are initially spaced apart prior to connection with the battery cable end.

5. The device according to claim 4, wherein the edges of the first split cylindrical-shaped metal plate end section abut each other after the first split cylindrical-shaped metal plate is pressed inwardly or crimped closed to connect the battery cable end to the battery cable connector.

6. The device according to claim 1, wherein the edges of the first split cylindrical-shaped metal plate end section are provided with interlocking fingers.

7. The device according to claim 1, wherein the first cylindrical-shaped metal plate end section is a continuous cylindrical-shaped metal plate end configured to be pressed inwardly or crimped to secure and anchor the battery cable end within the battery cable connector.

8. The device according to claim 1, wherein the first cylindrical-shaped metal plate end section is a first continuous cylindrical-shaped metal plate end section having one or more threaded holes each accommodating a set screw for securing the battery cable end within the battery cable connector.

9. The device according to claim 1, wherein the first split cylindrical-shaped metal plate end section has a greater wall thickness than a wall thickness of the second split cylindrical shaped metal plate section.

10. The device according to claim 9, wherein the inner diameter of the first split cylindrical-shaped metal plate end section is same as an inner diameter of the second split cylindrical-shaped metal plate section.

11. The device according to claim 9, wherein the second split cylindrical-shaped metal plate section transitions into a third funnel-shaped metal plate section tapering outwardly with an increasing diameter along the length of the third funnel-shaped metal plate section.

12. The device according to claim 1, wherein at least one of the first inner metal battery clamp member and the second inner metal battery clamp member have a U-shaped transverse cross section extending along a length of the at least one of the first inner metal battery clamp member and the second inner metal battery clamp member providing a pair of spaced apart inner edges, the U-shaped transverse cross section transitioning into the battery cable connector.

13. The device according to claim 1, wherein the first inner metal battery clamp member is provided with a pair of pivot plate portions and the second inner metal battery clamp member is provided with a pair of pivot plate portions, wherein the pair of pivot plate portions of the first inner metal battery clamp member overlap with the pair of pivot plate portions of the second inner metal battery clamp member.

14. The device according to claim 13, wherein the pair of pivot plate portions of the first inner metal battery clamp member are provided with arc-shaped flanges protruding outwardly from the sides of the first inner metal battery clamp member to accommodate the pivot plate portions of the second inner metal battery clamp, wherein the pivot plate portions of the second inner metal battery clamp are arc-shaped and nest within the arc-shaped flanges protruding outwardly from the sides of the first inner metal battery clamp.

15. The device according to claim 1,
wherein the inner battery clamp nests within the outer battery clamp.

16. The device according to claim 1,
wherein the first inner metal battery clamp member having the handle portion and the clamp portion nests within at least a portion of the first outer insulating battery clamp member having the handle portion and the clamp portion connected to the first inner metal battery clamp, and
wherein a second inner metal battery clamp member having a handle portion and a clamp portion nests within at least a portion of the second outer insulating battery clamp member having the handle portion and the clamp portion connected to the second inner metal battery clamp.

17. The device according to claim 16,
wherein the first outer insulating battery clamp member snap fits onto the first inner metal battery clamp member, and
wherein the second outer insulating battery clamp member snap fits onto the second inner metal battery clamp member.

18. The device according to claim 17,
wherein the first outer insulation battery clamp member comprises a snap fit protrusion snap fitting into a slot provided in the first inner metal battery clamp member, and
wherein the second outer insulation battery clamp member comprises a snap fit protrusion snap fitting into a slot provided in the second inner metal battery clamp member.

19. The device according to claim 18,
wherein the first outer insulation battery clamp member comprises a plurality of spaced apart snap fit protrusions snap fitting into a plurality of spaced apart slots, respectively, in the first inner metal battery clamp member, and wherein the second outer insulation battery clamp member comprises a plurality of spaced apart snap fit protrusions snap fitting into a plurality of spaced apart slots provided in the second inner metal battery clamp member.

20. The device according to claim 18, wherein each snap fit protrusion is split into two protrusion portions each having an edge barb portion to grip inner edges of respective slots after being snap fitted to prevent disconnection of each snap fit protrusion from each respective slot.

21. The device according to claim 15,
wherein the arc-shaped flanges protruding outwardly from the sides of the first inner metal battery clamp member nest within arc-shaped inner edge portions of the first outer insulating battery clamp member, and
wherein the arc-shaped pivot plate portions of the first inner metal battery clamp nest with arc-shaped inner edge portions of the second outer insulating battery clamp member.

22. The device according to claim 1,
wherein the handle portion of the first outer insulating battery clamp member is provided with a protrusion, and
wherein the handle portion of the second outer insulating battery clamp member is provided with a protrusion.

23. The device according to claim 22, wherein the protrusions form an X-shaped protrusion when the handle portions are squeezed together.

* * * * *